3,145,235
NITRATION PROCESS

Joseph B. Ashton, La Porte, Tex., assignor to Shell Oil Company, New York, N.Y., a corporation of Delaware
No Drawing. Filed Aug. 15, 1963, Ser. No. 302,480
5 Claims. (Cl. 260—644)

This invention relates to 1-nitro- and 1,8-dinitro-2,7-dimethylnaphthalenes and to a process for their preparation by nitration of 2,7-dimethylnaphthalene.

The reaction of nitric acid or the higher oxides of nitrogen with aromatic hydrocarbons is well established in the art. In general, these reactions may be classified into two types, i.e., nitration (forming nitro-compounds) and oxidation. Typical nitration procedures comprise heating the aromatic hydrocarbon with nitric acid admixed with other acid, customarily sulfuric acid although an acetic acid-acetic anhydride mixture is also frequently employed. The reaction conditions largely determine the degree of nitration obtained, and almost invariably a mixture of isomeric nitrated products is obtained. The presence of other acid is generally required to promote the formation of the nitronium ion, $NO_2^+$, which serves as the active nitrating species, or to increase the mutual solubility of the aromatic hydrocarbon and the nitric acid. The requirement for the presence of other acid creates attendant disadvantages, as the corrosive nature of the spent acid mixture from the nitration process results in problems of handling and disposal. The U.S. Patent 2,739,174 to Ross describes a method for the mono-nitration of certain mononuclear aromatic hydrocarbons wherein nitric acid is the only acid present. In this process, an elaborate physical separation is employed to remove the nitrated product from the water and other components of the reaction mixture.

When an alkylated naphthalene is employed as the aromatic hydrocarbon, particularly when the alkyl substituents are methyl, additional problems arise because of oxidation of the substituents by the nitric acid U.S. Patent 2,644,841 to Tabet describes a process for the oxidation of 2-methyl-6-acetylnaphthalene to 2,6-naphthalic acid by treatment with aqueous nitric acid, a process wherein the methyl group is oxidized to a carboxy radical, no nitrated product being observed. More recently, Chemical and Engineering News, March 25, 1963, page 51, describes a process wherein 2,6-dimethylnaphthalene is oxidized to the corresponding dicarboxylic acid by treatment with nitrogen dioxide.

It is an object of this invention to provide a process for the nitration of 2,7-dimethylnaphthalene to produce 1-nitro- and 1,8-dinitro-2,7-dimethylnaphthalene.

It has now been found that this object is accomplished by reacting 2,7-dimethylnaphthalene with aqueous nitric acid. It has been found that nitration proceeds readily in the absence of other acid and without appreciable oxidation, to yield 1-nitro- and 1,8-dinitro-2,7-dimethylnaphthalene.

The nitration process of the invention is preferably conducted in the liquid phase. A typical procedure comprises suspending the 2,7-dimethylnaphthalene in the aqueous nitric acid, and heating to effect nitration. Best results are obtained when the reaction mixture is agitated during reaction, as by stirring or shaking.

The nitric acid is employed as an aqueous solution. Although any convenient concentration of hydrogen nitrate may be employed, advantageous use is made of commercially available "dilute" and "concentrated" nitric acids, whose concentrations are about 14% and 71% by weight hydrogen nitrate in water, respectively.

The concentration of the aqueous nitric acid will to some extent influence the type of product obtained, although the temperature of the nitration reaction is an additional factor. When mono-nitration is desired, best results are obtained by employing a comparably dilute nitric acid, preferably containing from about 12% to about 20% hydrogen nitrate by weight, e.g., commercially available "dilute" nitric acid, although more dilute or more concentrated acid may be employed. The preferred method of effecting di-nitration comprises reacting 2,7-dimethylnaphthalene, with a more concentrated solution of nitric acid, preferably containing from about 65% to about 80% hydrogen nitrate by weight, such as the commercially available "concentrated" nitric acid. Alternatively, however, the mononitro derivative produced by initial nitration under milder reaction conditions may subsequently be treated with a more concentrated nitric acid to effect the introduction of a second nitro substituent.

The nitric acid is preferably employed in molar excess over the 2,7-dimethylnaphthalene. Suitable molar ratios of hydrogen nitrate to naphthalene derivative vary from about 2:1 to about 30:1. In general, mono-nitration is favored when the lower molar ratios of hydrogen nitrate to naphthalene derivative are employed, and to effect mono-nitration, molar ratios of from about 3:1 to about 8:1 are preferred. Alternatively, the formation of dinitro derivative is promoted by higher ratios of hydrogen nitrate to 2,7-dimethylnaphthalene. For this latter purpose, molar ratios from about 15:1 to about 25:1 are preferred.

The process of the invention may be conducted within a wide temperature range. Suitable reaction temperatures vary from about 60° C. to about 150° C., although temperatures from about 85° C. to about 120° C. are preferred. The process of the invention may be conducted at atmospheric, subatmospheric or superatmospheric pressure, so long as the reaction mixture is maintained in the liquid phase. The process is efficiently conducted, however, at pressures that are substantially atmospheric, and the use of such pressures is preferred. Typical reaction times vary from about 2 to about 8 hours.

The products of the nitration process are nitro derivatives of 2,7-dimethylnaphthalene, which may be mono- or di-nitro derivatives depending upon the temperature employed during reaction, the ratio of hydrogen nitrate to naphthalene derivative and the concentration of the nitric acid employed. Due to the deactivating influence of the initial nitro substituent introduced, it is possible to effect mononitration without the formation of substantial amounts of dinitrated product, although alternatively it is possible to effect high conversions to the dinitro derivative by employing somewhat more vigorous reaction conditions, e.g., more concentrated nitric acid, a higher ratio of hydrogen nitrate to naphthalene derivative, or a higher reaction temperature.

It is known that in general, the alpha positions of the naphthalene nucleus, i.e., the 1, 4, 5 and 8 positions, are the more reactive. The activity of the 1 and 8 positions of the dimethylnaphthalene of the invention appears to be re-enforced by the presence of the adjacent methyl substituents in the 2 and 7 positions, so that substantially all nitration takes place in the 1 and 8 positions to produce 1-nitro-2,7-dimethylnaphthalene when mononitration is effected, and 1,8-dinitro-2,7-dimethylnaphthalene when dinitration has taken place. Thus, the products of the process of the invention are adjacent alpha mono- to dinitro-2,7-dimethylnaphthalenes represented by the formula

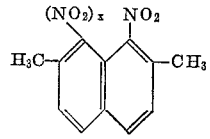

wherein $x$ is a whole number from 0 to 1, inclusive. As the products of the invention are relatively free from isomeric mononitro or dinitro derivatives, the separation and recovery of the desired products is greatly simplified. Subsequent to the nitration process, the reaction mixture is cooled and the nitro products, which are insoluble in the aqueous solution, are recovered by conventional means, as by filtration, centrifugation or the like.

The 1-nitro- and 1,8-dinitro-2,7-dimethylnaphthalenes, which are believed to be novel compounds, find utility as chemical intermediates. For example, they are reduced by conventional means to the corresponding amino derivatives from which useful quaternary ammonium salts are prepared. In addition, the 1,8-diamino-2,7-dimethylnaphthalene, also believed to be novel, is a superior chelating agent for iron, nickel and like metals because of the particular location of the amino substituents and the presence of the electron-donating methyl groups on the adjacent carbon atoms. Alternatively, the amino derivatives are useful as epoxy curing agents and in the production of azo dyes and isocyanates, and the nitro derivatives are useful as antioxidants, polymerization inhibitors, and as fungicides, herbicides and the like.

To further illustrate the process of the invention, the following examples are provided. It should be understood that they are not to be regarded as limitations, as the teachings thereof may be varied as will be understood by one skilled in this art.

*Example I*

To a suitable reactor was charged 15.6 g. of 2,7-dimethylnaphthalene and 250 ml. of 14% aqueous nitric acid. The suspension was stirred at 100° C. for 4 hours at atmospheric pressure. The reaction mixture was cooled and filtered, and the precipitate washed with water. An 83% recovery of crude 1-nitro-2,7-dimethylnaphthalene was obtained. The product, when recrystallized from isopropanol-water, melted at 77–78.8° C. The infrared and nuclear magnetic resonance spectra are consistent with the structure 1-nitro-2,7-dimethylnaphthalene.

|  | Anal. Calc. | Found |
|---|---|---|
| C, percent wt | 71.62 | 71.65, 71.90 |
| H, percent wt | 5.51 | 5.59, 5.78 |
| N, percent wt | 6.96 | 6.84, 6.69 |

Similar results were obtained when the reaction was carried out under approximately 35 p.s.i.g. pressure.

*Example II*

In 750 ml. of concentrated nitric acid (70%) was suspended 46.8 g. of 2,7-dimethylnaphthalene. The mixture was maintained at 110° C. for 4 hours at atmospheric pressure. The suspension was cooled and filtered, and the precipitate was washed with water. A 67% yield of crude product was obtained. Recrystallized product, yellow rhombohedral plates from glacial acetic acid, melts at 243–245° C. with decomposition. The infrared and nuclear magnetic resonance spectra are consistent with the structure 1,8-dinitro-2,7-dimethylnaphthalene, and the elemental analysis corresponds thereto.

|  | Anal. Calc. | Found |
|---|---|---|
| C, percent wt | 58.54 | 58.36, 58.51 |
| H, percent wt | 4.09 | 4.06, 4.20 |
| N, percent wt | 11.38 | 11.30, 11.18 |

Related results are obtained when 1-nitro-2,7-dimethylnaphthalene is treated with 70% nitric acid at 110° C.

*Example III*

The product of Example II, 1,8-dinitro-2,7-dimethylnaphthalene, was reduced to the corresponding diamine by adding 30 g. of the dinitro derivative, in 2 g. increments, to a stirred mixture of 80 g. iron filings, 80 ml. of water, 80 ml. of methanol and 5 ml. of concentrated hydrochloric acid maintained during addition at 70–80° C. The mixture was refluxed for 1 hour, cooled, neutralized with aqueous sodium carbonate and diluted with 400 ml. of water. The resulting precipitate was filtered and triturated in refluxing benzene. The hot benzene solution was filtered, and afforded 16 g. (70.7% of theory) of 1,8-diamino-2,7-dimethylnaphthalene product upon removal of solvent. The infrared spectrum (KBr disk) of the product, recrystallized from a 1:1 benzene-hexane solution, possessed bands at 3360 and 3340 cm.$^{-1}$ which are characteristic of a 1,8-diamino derivative.

I claim as my invention:

1. The process for the nitration of 2,7-dimethylnaphthalene by reacting 2,7-dimethylnaphthalene with aqueous nitric acid at a temperature of from about 60° C. to about 150° C., to produce adjacent alpha mono- to dinitro-2,7-dimethylnaphthalene.

2. The process of claim 1 wherein the temperature is from about 85° C. to about 120° C.

3. The process of claim 1 wherein the aqueous nitric acid has a concentration of from about 12% to about 80% by weight hydrogen nitrate.

4. The compound 1,8-dinitro-2,7-dimethylnaphthalene.

5. The compound 1-nitro-2,7-dimethylnaphthalene.

No references cited.